United States Patent [19]

Guironnet

[11] Patent Number: 5,032,347

[45] Date of Patent: Jul. 16, 1991

[54] DEVICE AND METHOD FOR STRAIGHTENING THE GUIDE FINS OF THE SPACER GRIDS OF A FUEL ASSEMBLY OF A NUCLEAR REACTOR

[75] Inventor: Louis Guironnet, Lyon, France

[73] Assignees: Framatome, Courbevoie; Cogema, Velizy-Villacoublay, both of France

[21] Appl. No.: 458,198

[22] Filed: Dec. 28, 1989

[30] Foreign Application Priority Data

Dec. 28, 1988 [FR] France .................................. 88 17347

[51] Int. Cl.⁵ ............................................... G21C 19/00
[52] U.S. Cl. ..................................... 376/248; 376/260; 72/386
[58] Field of Search ................ 376/260, 261, 245, 248; 72/316, 322, 386, 470; 29/723, 906

[56] References Cited

U.S. PATENT DOCUMENTS

| | | | |
|---|---|---|---|
| 4,427,622 | 1/1984 | Knecht et al. | 376/260 |
| 4,652,421 | 3/1987 | Widener | 376/260 |
| 4,736,613 | 4/1988 | Dailey | 376/260 |
| 4,791,801 | 12/1988 | Kramer et al. | 376/260 |

FOREIGN PATENT DOCUMENTS 2298859 8/1976 France .

Primary Examiner—Daniel D. Wasil
Attorney, Agent, or Firm—Pollock, Vande Sande & Priddy

[57] ABSTRACT

The device comprises a work tool (35) fixed on a crossed displacement carriage device (26). The tool comprises a sliding block (42) mounted so as to move in a guide (39). A bearing stop (45) is fixed to the end of the slide of the guide (39). A folding hook (43) is fixed to the end of the sliding block (42) in order to engage with the fin (12), the stop (45) bearing against the small plate (10) of the spacer grip. The sliding block (42) may be displaced by a ball remote control.

7 Claims, 7 Drawing Sheets

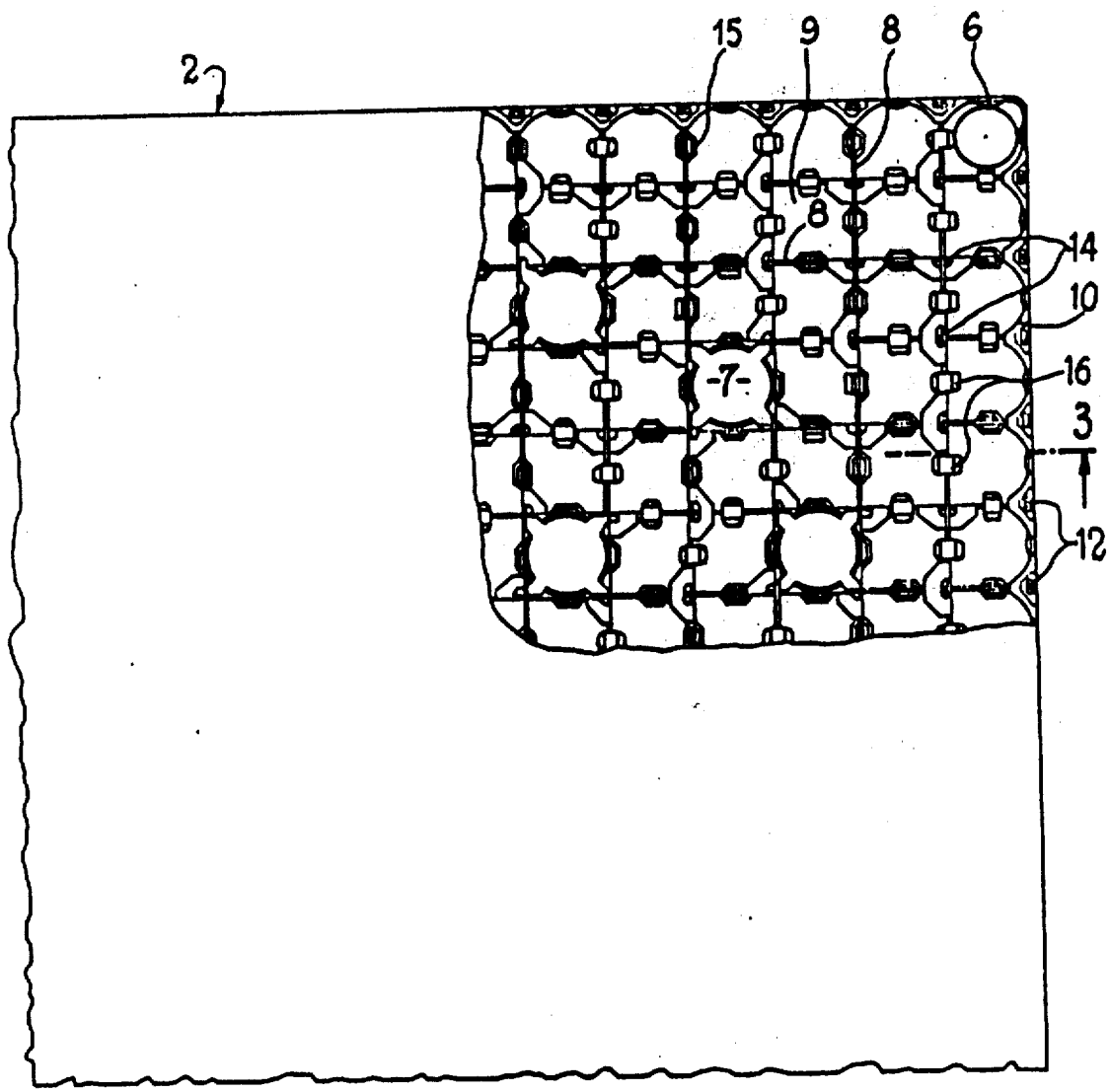
FIG_2

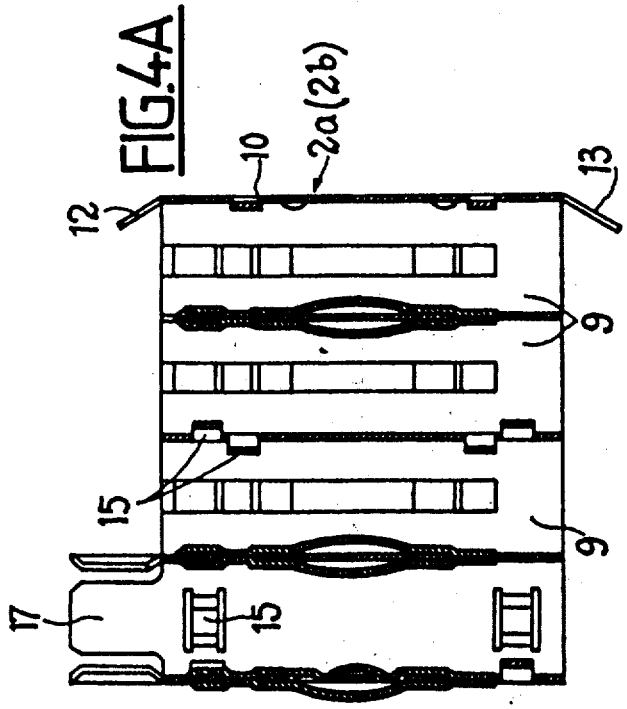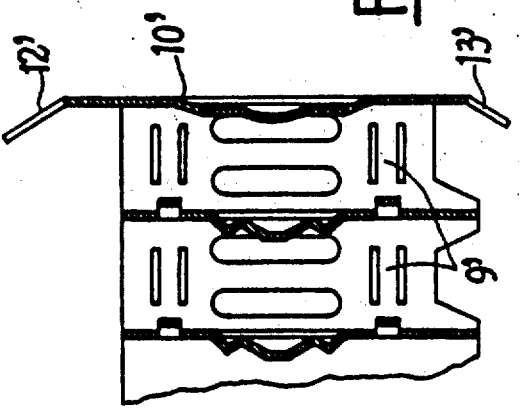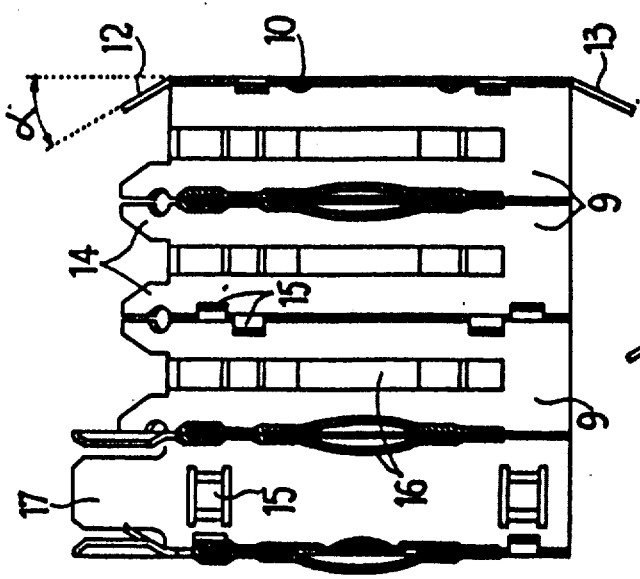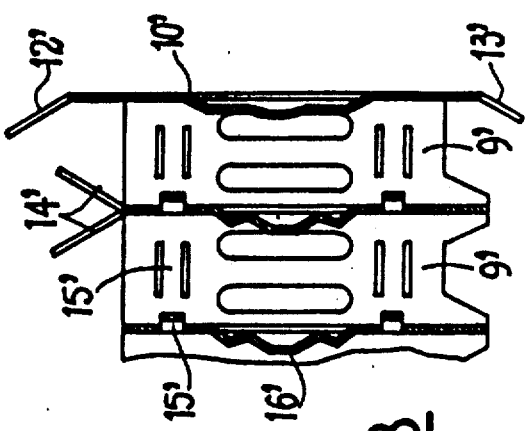

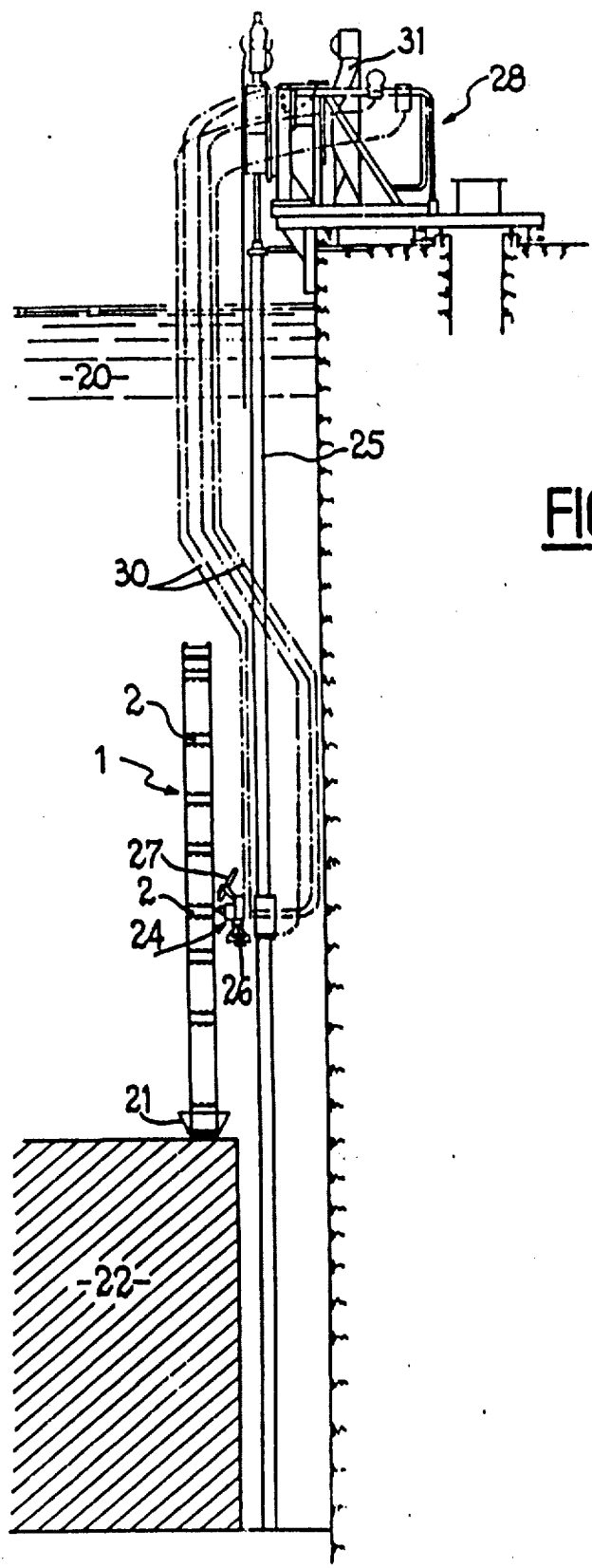
FIG_5

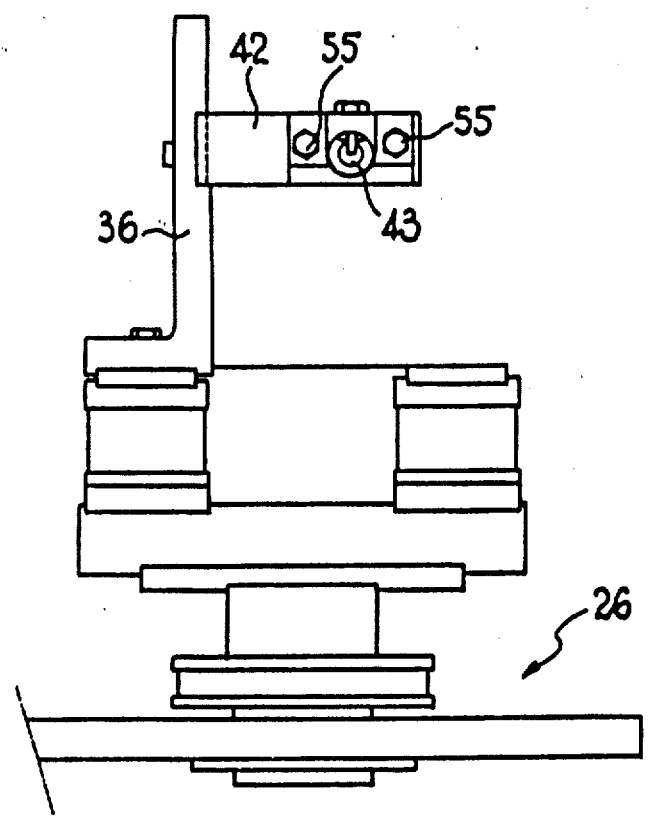
FIG_8

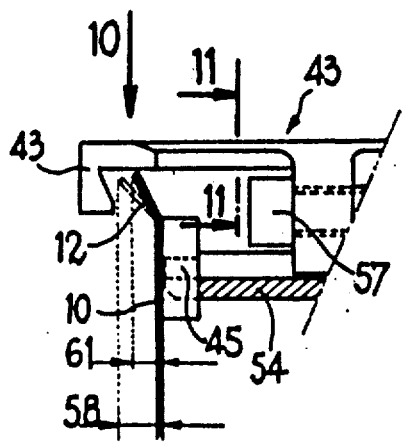
FIG_9
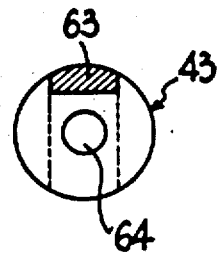
FIG_11
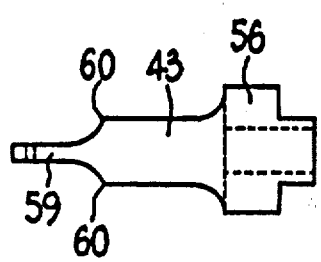
FIG_10
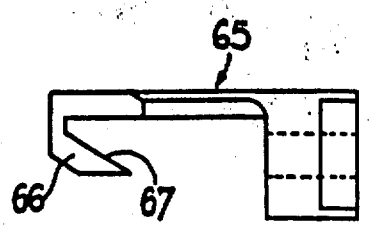
FIG_12
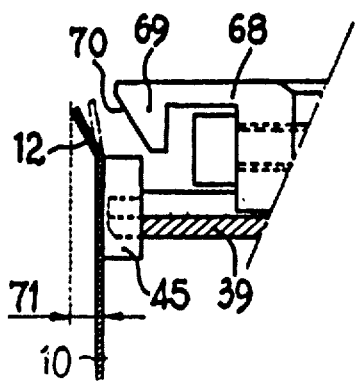
FIG_13

DEVICE AND METHOD FOR STRAIGHTENING THE GUIDE FINS OF THE SPACER GRIDS OF A FUEL ASSEMBLY OF A NUCLEAR REACTOR

FIELD OF THE INVENTION

The invention relates to a device for straightening the guide fins of the spacer grids of a fuel assembly of a nuclear reactor.

BACKGROUND OF THE INVENTION

The fuel assemblies of nuclear reactors, such as pressurized-water nuclear reactors, comprise a framework in which fuel rods of great length are disposed in order to form a bundle The framework comprises spacer grids which are spaced relative to one another along the length of the assembly and connected together by guide tubes.

Each of the spacer grids comprises an assembly of cells each intended to receive a fuel rod and disposed in a regular network, generally a squared mesh.

The network forming the grid is surrounded by a frame whose transverse section corresponds to the section of the assembly and which consists of small plates assembled together, for example in the form of a contour of squared form.

The small plates forming the frame of the spacer grid are cut along their longitudinal edges to form fins which project relative to the upper lower faces of the spacer grid.

The fins are folded towards the inside of the grid along the edge of the corresponding small plate and so as to form a perfectly defined angle with the latter.

The fins of the spacer grids are intended, on the one hand, to facilitate the guiding of the fuel assembly when it is positioned in the core of the reactor or in a storage cell and, on the other hand, to ensure mixing of the primary coolant circulating in contact with the fuel assembly during operation of the reactor.

The guide fins of the spacer grids of the fuel assemblies are inclined inwards so as to prevent the grid of the assembly from hooking onto the structure of the internal equipment of the tank of the reactor or onto an adjacent fuel assembly during refuelling or discharging of the core of the reactor.

The fins of the spacer grids of the fuel assemblies may be deformed or folded under the effect of impacts which occur during their handling or produced by foreign bodies entrained by the coolant and circulating at high speed during operation of the reactor.

After a period of operation of the order of one year, the fuel assemblies contained in the tank of the reactor and forming the core may be examined, before being refuelled into the core, in order to determine whether any of them have been damaged.

Generally, only one-third of the assemblies of the core are renewed, but all the fuel assemblies are discharged in order to permit checking, for example inside the tank of the reactor.

The fuel assemblies are placed under water in a pool, such as a storage pool, in order to be examined before their possible refuelling into the core.

After an extended operating time, the guide fins of the spacer grids of some assemblies may be deformed, for the reasons given above.

In order to be able to reuse the fuel assemblies whose spacer grids may have deformed fins, it has been proposed to compensate for the fins which are deformed or folded at an angle different from their defined angle of inclination by completely folding the fins which are deformed or in an incorrect position in order to press them against the wall of the corresponding grid. However, when this is done, the fins can no longer fulfil their role in respect of guiding the assembly nor in respect of mixing the primary cooling fluid circulating in contact with the assembly.

Moreover, this operation of completely folding the fins runs the risk of leading to their breakage along the folding line before reaching the final position of the fin in contact against the small plate. This risk is greater when the metal of the small plate has been rendered less ductile due to irradiation.

Moreover, the devices proposed for performing these operations of completely refolding the fins are ill-adapted to implementation under a depth of water which is greater than the minimum biological protection, which corresponds to a depth of 3 meters.

SUMMARY OF THE INVENTION

The invention relates a device for straightening the guide fins of the spacer grids of a fuel assembly of a nuclear reactor intended for the transverse retention of the fuel rods and comprising an outer frame whose transverse section corresponds to the section of the assembly consisting of small metal plates comprising, on at least one of their sides corresponding to one of the edges of the frame, an assembly of fins having an inclination which is perfectly defined relative to the corresponding small plate. The operation for straightening the fins whose inclination has been modified by folding during operation or handling of the fuel assembly is effected remotely and under a certain depth of water in a pool by the device comprising a rod of great length on which is mounted a means for support and displacement of a work tool at the level of the assembly and which is movable in the axial direction of the rod and in two directions perpendicular to the axial direction of the rod, this device making it possible to reestablish the inclination of the fins very precisely regardless of their position in the deformed state, with operations being commanded and controlled remotely.

To this end, the work tool comprises:
- a guide means fixed rigidly on the tool support and having a slide which has a direction perpendicular to the shaft of the rod,
- a sliding block mounted so as to move on the slide of the guide means,
- a bearing stop fixed rigidly to one of the ends of the guide means in the vicinity of a corresponding end of the slide,
- at least one means for folding at least one fin integrally attached to one end of the sliding block which is distant from the shaft of the rod and located outside the slide of the guide means, in the vicinity of the bearing stop,
- a remotely controlled means for displacing the sliding block in the guide means, and
- at least one video camera carried by the support in order to provide an image of the zone in which straightening is being performed.

BRIEF DESCRIPTION OF THE DRAWINGS

In order to make the invention understandable, a description will now be given, by way of example, with reference to the drawings, of an embodiment of a device according to the invention and various embodiments of a tool which makes it possible to straighten the fins of spacer grids of fuel assemblies.

FIG. 2 is a partial plan view of a spacer grid of the assembly represented in FIG. 1.

FIG. 3A is a sectional view according to 3—3 in FIG. 2, in the case of an intermediate spacer grid of the assembly.

FIG. 4A is a view similar to FIG. 3A of an end grid of the fuel assembly shown in FIG. 1.

FIGS. 3B and 4B are views similar to FIGS. 3A and 4A, respectively, of an intermediate grid and of an end grid of a fuel assembly of conventional structure, in the case of pressurized-water nuclear reactors.

FIG. 5 is a schematic view in elevation of the straightening device according to the invention in an operating position in a fuel assembly storage pool.

FIG. 8 is a side view in the direction of arrow 8 in FIG. 6.

FIG. 9 is an enlarged view of the detail 9 in FIG. 6.

FIG. 10 is a plan view in the direction of arrow 10 in FIG. 9.

FIG. 11 is a sectional view in the direction of arrow 11 in FIG. 9.

FIG. 12 is a view in side elevation of an alternative embodiment of the means for straightening fins of a work tool of a device according to the invention.

FIG. 13 is a view similar to FIG. 9 in the case of the use of a means for refolding fins, according to a second alternative embodiment.

DESCRIPTION OF PREFERRED EMBODIMENT

Figure 1:
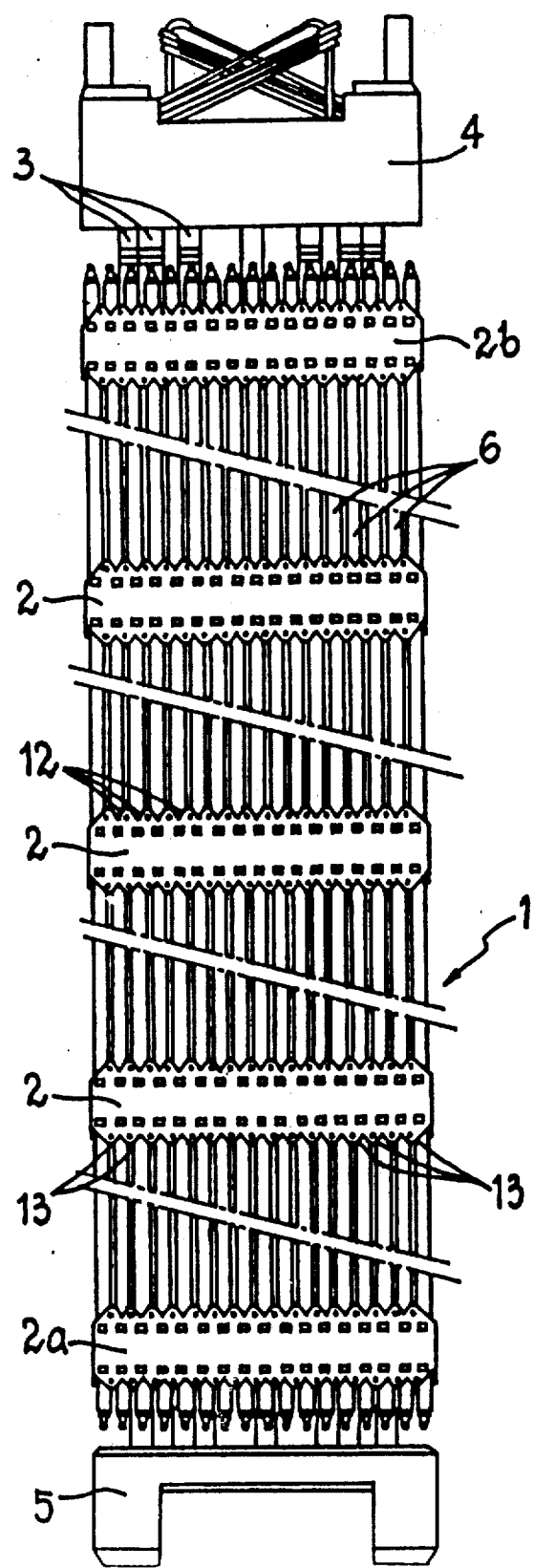
FIG. 1 is a view in side elevation of a fuel assembly of an advanced structure.

FIG. 1 shows a fuel assembly 1 comprising a framework consisting of spacer grids 2 spaced in the longitudinal direction of the assembly, guide tubes 3, to which the grids 2 are rigidly fixed, an upper joining piece 4 and a lower joining piece 5 which are fixed to the end of the guide tubes 3.

The fuel rods 6 of the assembly which are shorter than the guide tubes 3 are positioned in the framework so as to form a bundle in which the rods are disposed parallel to one another.

The rods are held laterally by the spacer grids 2 so as to form a uniform network of square mesh in the transverse sections of the assembly.

The end grids 2a and 2b of the assembly differ in structure from the intermediate grids 2, as will be explained hereinbelow.

In storage position or in operating position, the assembly is disposed vertically as shown in FIG. 1 and rests on a support by means of its lower joining piece 5.

FIG. 2 shows an intermediate spacer grid 2 or mixing grid of the assembly shown in FIG. 1.

Such a mixing grid consists of an assembly of small metal plates 8 disposed and assembled at right angles so as to form a network of square mesh, each of the cells 9 of which can receive a fuel rod 6 in order to position it in the network and hold it laterally.

Some cells 7 are intended to receive a guide tube 3 which is fixed rigidly to the walls of the cell 7.

The spacer grids 2 and the guide tubes 3 thus form a rigid framework which is capable of receiving the fuel rods 6.

According to its outer contour whose square form corresponds to the section of the fuel assembly, the spacer grid 2 is delimited by a frame consisting of small plates 10 assembled at right angles according to the angles of the spacer grid 2.

As may be seen in FIGS. 2 and 3A, the upper edge of each of the small plates 10 is cut in order to form successive fins 12 which are folded towards the inside of the spacer grid in order to form, with the plane of the small plate 10, an angle of perfectly defined value, which may be seen in FIG. 3A.

In the case of a spacer grid of an assembly of developed structure, as shown in FIGS. 2, 3A and 4A, sixteen fins 12 are disposed on the upper edge of each of the small plates 10 of the square-section outer frame of the spacer grid, these fins 12 forming guide fins for the assembly during handling.

As may be seen in FIG. 1, the lower edge of each of the small plates of the frame of a spacer 2 of the assembly comprises guide fins 13 which are also folded towards the inside of the spacer along the lower edge of the corresponding small plate in order to form an angle which is perfectly defined with the plane of this small plate 10 of the frame of the spacer grid.

Each of the intermediate spacer grids 2 of the assembly also comprises, in the extension of the upper edge of each of the cells 9 receiving a fuel rods, fins 14, called mixing fins, which mix the cooling water circulating in contact with the rod where it emerges from the spacer grid. A homogenization of temperature of the water removing the heat provided by the fuel rods of the assemblies is thus obtained.

Each of the cells 9 intended to receive a fuel rod comprises bosses 15 projecting towards the inside of the cell 9 and springs 16 generally comprising two active parts in two adjacent cells 9 of the spacer grid. The fuel rods 6 are held inside the cells 9 between the springs 16 and the bosses 15.

In the case of a cell 7 intended to receive a guide tube 3, a sleeve 17 permits the rigid fixing, generally by crimping, of the guide tube on the spacer grid.

In the case of the fuel assembly of advanced structure, such as that shown in FIGS. 2, 3A and 4A, the springs 16 are made of a nickel alloy which has great elasticity and very good behavioral characteristics in the environment of the nuclear reactor. These springs 16 are attached and fixed onto the small plates in the zones forming certain walls of the cells.

The small plates made of zirconium alloy are assembled together to form the cells and stamped so as to enable the bosses 15 to be formed.

In the case of an end spacer grid, such as 2a or 2b shown in FIG. 4A, the walls of the cells 9 intended to receive fuel rods do not comprise, in the extension of their upper edge, mixing fins 14. On the other hand, the small plates 10 forming the outer frame of these spacer grids comprise guide fins 12 and 13 inclined towards the inside of the spacer grid, according to a perfectly defined angle, in the same manner as the intermediate mixing grids 2.

FIGS. 3B and 4B show two cells 9' adjacent to a plate 10' of the outer frame of a spacer grid having a conventional structure and different from the developed structure of the grid shown in FIGS. 2, 3A and 4A.

Such a spacer grid of conventional structure consists solely of small plates made of zirconium alloy assembled in order to form a network of square mesh and in which the bosses 15' and the springs 16' for holding the fuel pencils are produced by stamping and shaping.

In the case of intermediate mixing grids, such as shown in FIG. 3B, the upper parts of the small plates forming the walls of the cells are extended by mixing fins 14' which are inclined towards the inside of the cells 9'.

On the other hand, in the case of spacer grids, such as shown in FIG. 4B, the upper parts of the small plates delimiting the cells do not comprise such mixing fins.

In the case of intermediate spacer plates as well as end spacer plates, the small plates 10' forming the outer frame of the spacer grid comprise, on their upper edge as well as on their lower edge, guide fins 12' and 13' which are folded towards the inside of the spacer grid, forming an angle which is perfectly defined relative to the plane of the corresponding small plate 10'.

However, in this type of conventional assembly, the fins 12' and 13' are not folded along an edge of the small plate 10' located at the level of the upper edges of the small plates delimiting the cells, but along a part of the small plate 10' located above this upper part of the cells.

This construction, which is less satisfactory than that shown in FIGS. 3A and 4A as regards the resistance to deformation of the spacer plate, makes it possible to fold the guide fins 12' or 13' completely back against the inner surface of the corresponding small plate 10'.

Quite obviously, this possibility does not exist in the case of the guide fins 12 and 13 of an assembly of developed structure, insofar as these fins 12 and 13 are located at the level of a small plate delimiting a row of cells of the grid. In this case, the guide fin 12 or 13 can be folded back towards the inside only by an angle of 90°. This angle is generally in the region of 70°. This thus results in difficulty in inserting the fuel rods and in circulating the cooling fluid at the entrance or at the exit of the spacer grid.

In all cases, when the guide fins 12 and 13 or 12' and 13' are folded towards the inside, these fins no longer fulfil their guide function during handling of the assembly.

The device according to the invention shown generally in FIG. 5 makes it possible to straighten the guide fins of the spacer grids of a fuel assembly located in a pool, when these guide fins have been deformed or folded back during handling of the assembly. The operation performed by the device according to the invention makes it possible to replace the guide fins in a position in which their inclination corresponds to the perfectly defined inclination according to the design of the spacer grid.

FIG. 5 shows the device according to the invention in a position which makes it possible to straighten the guide fins of the spacer grids of a fuel assembly 1 located in a vertical position in a fuel assembly storage pool 20. The lower part of the fuel assembly 1 is engaged in a support device 21 which itself rests on a base 22. The device 21 has a certain conicity and is flared towards the top in order to facilitate insertion of the lower part of the fuel assembly 1.

The work tool which makes it possible to straighten the guide fins of the spacer grids of the assembly 1, denoted generally by the reference 24, may be positioned at the level of the spacer grid 2 on which straightening is being performed by a device for support and displacement comprising a rod 25 or column of great length which is substantially vertical, along which a crossed carriage displacement assembly 26 carrying the work tool 24 can be displaced in the vertical direction. The crossed carriage device 26 also carries at least one video camera 27 which makes it possible to provide an image of the zone in which the fins of the spacer grid are being straightened.

The upper part of the fuel assembly is placed under a depth of water of the order of four meters and the operations of positioning the work tool and straightening the fins are commanded from a control station 28 disposed above the upper level of the pool 20 and consisting of a platform on which are fixed the ends of the remote control devices 30 which make it possible to remotely activate the means for displacing the work tool 24 and the means for controlling this tool.

The remote control means 30 consist of sheaths of great length in which it is possible to displace a maneuvering element, which is rigid in the pushing direction and deformable in flexion, guided by balls from the control station 28. Such a device, which is generally known as a ball remote control, is well known in the general field of remote controls.

An operator 31 has handles which are accessible from the platform of the control station 28 in order to displace the crossed carriage assembly 26 in the vertical direction along the rod 25 in order to place the work tool 24 at the level of a spacer grid 2 on which the guide fins are being straightened. Moreover, the operator 31 can accurately position the work tool by remotely controlling the crossed carriages 26 whose displacements are guided in two directions which are perpendicular to one another and perpendicular to the substantially vertical axis of the rod 25.

From the control station 28, the operator 31 can also command the activation of the tool for straightening the fins.

The assembly of the device for positioning the work tool comprising the rod 25 and the crossed displacement carriages 26 is the subject of a patent application by the companies FRAMATOME and COGEMA filed on the same day as the present patent application.

Figure 6:
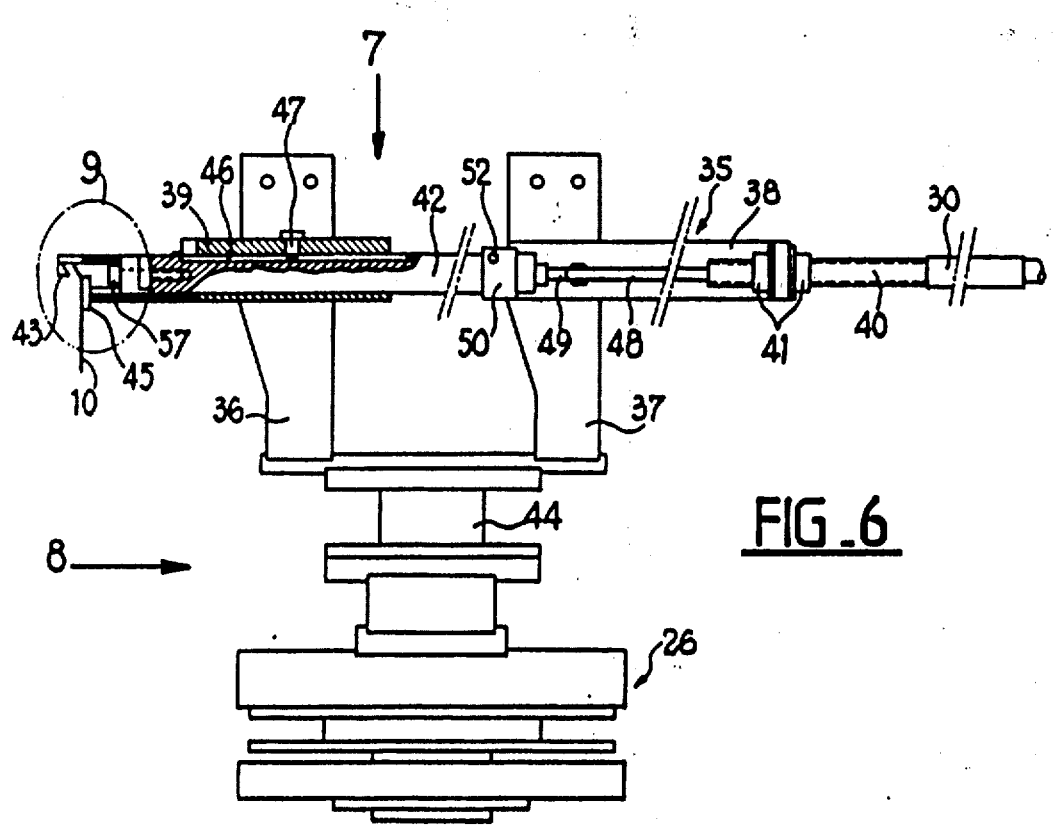
FIG. 6 is a front view of the work tool of the straightening device according to the invention.
Figure 7:
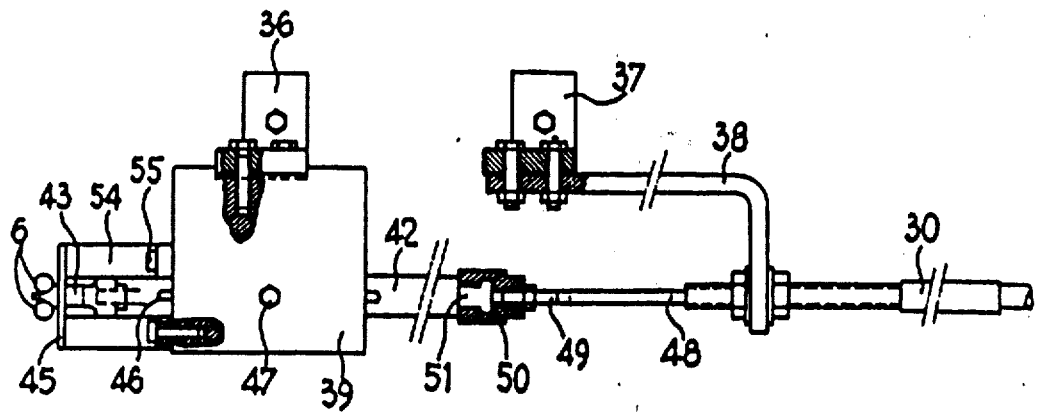
FIG. 7 is a plan view in the direction of arrow 7 in FIG. 6.

FIGS. 6, 7 and 8 show the crossed carriage device 26, on the upper part of which are fixed two brackets 36 and 37 in vertical position. The tool 35 for straightening the fins is supported by the brackets 36 and 37 by means of a bracket 38 and a guide support 39 which are fixed on the bracket 37 and on the bracket 36, respectively.

The end of the sheath 40 of the ball remote control 30 which activates the straightening tool is fixed on the bracket 38 by means of two nuts 41.

The guide support 39 delimits, in its inner part, a slide in which is mounted a sliding block 42 carrying a straightening hook 43 at its end. The slide of the guide support 39 has a direction which is substantially perpendicular to the axis of the rod 25. The hook 43 projects at the end of the slide of the support 39, this end of the support 39 being integrally attached to a bearing stop 45.

The sliding block 42 comprises, at its upper end, a longitudinal groove 46 in which is engaged the end of a screw 47 passing through the upper part of the support 39.

The sliding block 42 and the end hook 43 of this slide can be displaced in the direction of the slide perpendicular to the shaft 44 while being guided by the screw 47 engaged in the groove 46. The orientation of the sliding block and of the hook 43 about the axis of translation of the sliding block is thus fixed in this way.

The element 48 forming the inner movable part of the ball remote control 30 is fixed, at its end, to a threaded rod 49 which is itself engaged in a threaded hole of a joining piece 50. The joining piece 50 comprises a T-shaped groove 51 in which an end part of corresponding form of the sliding block 42, opposite to the hook 43, engages. A screw 52 makes it possible to rigidly join the sliding block 42 and the joining piece 50.

The bearing stop 45 is fixed on the support 39, at the end of the slide located towards the outside relative to the shaft 44 of the rod, by means of a support 54 extending the slide at its lower part and two screws 55 fixed in the support 39.

FIGS. 6 and 9 show that, during use of the tool 35 for straightening a guide fin 12 of a spacer grid of the assembly, the stop 45 bears on the outer face of the small plate 10 of the frame of the spacer grid so that its upper edge is located exactly on the folding line of the guide fin 12.

The hook 43 comprises a body 56 which is fixed by means of a screw 57 to the end of the sliding block 42.

In FIG. 9, the fin 12 has been shown in solid lines in a position corresponding to its normal position whose inclination is perfectly defined, and in dotted lines in its deformed before straightening.

The position of the end of the nose of the hook 43 relative to the bearing face of the stop 45, in the longitudinal direction of the sliding block, is adjusted so that the distance 58 between the inner end of the nose of the hook 43 and the bearing face of the stop 45 is greater than the distance separating the end of the fin 12 in its deformed position from the folding line of the small plate 10.

On the other hand, the slope of the inner surface of the nose of the hook 43 corresponds to the inclination of the guide fin 12 in its correct position shown in solid lines and obtained after straightening, bearing in mind the elastic deformation of this fin.

The hook 43 is engaged on the fin 12 to be straightened from above, the lower part of the bearing surface of the stop 45 coming into contact with the outer surface of the small plate 10.

The assembly of the device for positioning the tool is then lowered in order to position the hook 43 in its position shown in FIG. 9. In this position, the end edge of the fin 12 is located slightly below the upper edge of the inner surface of the hook 43.

As may be seen, in particular, in FIG. 10, the front part of the hook 43 comprises a flat 59 and two curved parts 60 so that the end of the hook can be inserted between the two fuel rods 6 disposed in the cells located on either side of the fin 12 to be straightened.

The fin 12 is straightened by displacing the hook 43 by a perfectly determined amount, in the direction of the small plate 10.

After this perfectly defined displacement, the distance 61 separating the end of the fin from the plate 10 corresponds to the perfectly defined correct position of this fin which is held in a straightened position by means of the inner surface of the hook 43 whose slope corresponds to the defined inclination of the fin 12.

The sliding block 43 of the small plate 10 is displaced by pulling on the movable element 48 of the ball remote control 30, resulting in a displacement of the sliding block and of the hook 43 by a perfectly defined amount.

The amount of displacement of the ball remote control is selected so as to very slightly exceed the defined position of the fin 12 which returns to its correct position, as a result of elasticity, after the force exerted by the hook 43, by means of the sliding block 42, has been released.

FIG. 11 shows the section of the joining part 63 of the hook 43 between the body 56 and the nose delimited by the flats 59, as well as the hole 64 for fixing the hook 43 on the end of the sliding block 42 by means of screws 57.

FIG. 12 shows a hook 65 comprising a nose 66 whose inclined inner surface 67 has an inclination which is much greater relative to the vertical than the inclined surface of the hook 43 shown in FIG. 7A. A hook such as 65 may be used to begin straightening of the fins when the latter are very inclined, final straightening being ensured by the nose of the hook 43 used after a first straightening of the fin using the hook 65.

The form of the nose 66 of the hook may also be adapted in order to raise a fin when the latter is in a position inclined towards the inside of the spacer grid.

FIG. 13 shows a work tool whose end which replaces the hook 43 of the device shown in FIGS. 6, 7 and 8 consists of a thrust device 68 comprising an end nose 69 having an inclined surface 70 which makes it possible to cause a fin 12 in a defective raised position, shown in dotted lines, to be changed to a position of correct inclination, shown in solid lines.

In this case, the ball remote control is no longer activated in the pulling direction, but in the pushing direction after the end of the guide support 39 consisting of the stop 45 has been applied against the outer surface of the small plate 10.

In this case, the guide fin 12 is pushed back towards the inside of the spacer grid until it reaches its position of correct inclination. This position is determined very precisely by adjusting the distance 71 separating the end of the fin from the inner face of the small plate 10.

It is also possible to imagine a multipurpose tool which makes it possible simultaneously to push back fins which are excessively raised and to straighten fins which are folded towards the inside of the spacer grid. In this case, use will be made of a device combining straightening hooks, such as the hook 43, and a thrust device, such as the thrust device 68 shown in FIG. 13.

The straightening hooks are engaged on the fins adjacent to the fin being straightened and a thrust device, placed in an intermediate position between the straightening hooks, is applied to the fin located in a central position.

The various operations which have been described are checked by video cameras, such as the camera 27, carried by the crossed carriage device 26. An image of the zone in which the fins are being straightened is provided for the operator 31 by virtue of television screens.

The operations performed on the fins of a fuel assembly are determined by inspecting the assembly inside the pool. Generally, the inclination defect of the fins is of the order of 10° to 20° and they can be straightened by using a hook 43, the inner surface of the nose of which has the desired inclination. In fact, the inner angle of the surface of the nose of the hook 43 will be slightly more acute in order to take into account the elasticity of the fin when the pulling force is released, as explained hereinabove.

The amount of displacement of the movable part of the ball remote control of the tool is preadjusted so as directly to obtain the size adjustment corresponding to a correct straightening of the fin.

The rapid opening obtained by virtue of the handle of the remote control makes it possible to release the hook from the fin, the support of the crossed carriage device 26 then being maneuvered vertically along the rod 25 in order to displace this device.

Through out the operation for straightening the fin and during the operation for releasing the hook, the crossed carriage device is in a fixed position.

The fins can also be straightened by using the device with a floating carriage.

To this end, the tool for straightening the fins is mounted on the crossed carriage support, in its open position, i.e. with the straightening hook in its position separated from the end stop of the slide support. The hook is equipped with a miniaturized sensor which makes it possible to indicate to the operator by an indicator light located at the control station 28, that the end of the hook is correctly positioned on the fin 12.

The straightening operation consists in maneuvering the crossed carriages so as to engage the hook on the fin and in lowering the support until the indicator light indicates a correct position. The carriage supporting the straightening tool is then disengaged in order to render it floating. Acting on the handle of the ball remote control 30 makes it possible to bring the bearing stop closer, by reaction, to the peripheral small plate 10 and the bearing hook closer to the guide fin. The fin is thus straightened by self-centering.

In some cases, the fins may be greatly folded towards the inside of the spacer grid and, for example, in the case of a spacer grid of developed structure, shown in FIGS. 2, 3A and 4A, folded horizontally against the walls of the corresponding cells. In the case of an assembly of conventional structure, such as shown in FIGS. 3B and 4B, the guide fins 12' and 13' may even be folded towards the inside of the spacer grid beyond the horizontal position.

In this case, use is made of a hook, such as shown in FIG. 12, which makes it possible to commence straightening of the fin in a first phase.

In a second phase, the fin is straightened into its correct position by using a straightening hook of appropriate form.

The device for positioning the work tool may be designed so as to receive, on its horizontal plate, two crossed carriage devices. In this case, one of the carriages can receive a tool comprising a hook with great inclination, which makes it possible to commence straightening of the fins, and the other carriage can receive a finishing tool which makes it possible to straighten the fin into its correct and well-defined inclination. In this case, work times are reduced and the phases of changing tools, which can be highly irradiated, are eliminated, thus reducing the time that the operators are exposed to ionizing radiation.

The work tool can also comprise several hooks, this tool then having the form of a comb which is capable of acting simultaneously on several fins or even on the assembly of guide fins associated with a small plate of the outer frame of a spacer grid.

To this end, the tool can comprise two to sixteen hooks disposed adjacent to one another.

The tool which has been described can make it possible, by simply returning the guide support and the sliding block, to straighten fins located on the lower edge of the peripheral small plates of the spacer grid.

If the device for positioning the tool comprises two crossed carriage devices, it is possible to fit different tools for straightening the lower fins and the upper fins, respectively. It is also possible to fit a tool, which makes it possible to straighten the fins, on one of the crossed carriage devices and a tool intended to push back the fins on the other crossed carriage.

In this case, the tool for straightening the fins may be placed so as to provide a bearing reaction during the operation for pushing back the fins.

Three remotely oriented cameras monitor all the operations for straightening or pushing back the fins, in order to follow the progression of these operations and, in particular, to monitor whether the fin being straightened is likely to break along the folding line. If an incipient breakage is observed, the fin will be removed by using, for example, a tool for recovering foreign bodies in the fuel assemblies comprising tongs, such as described in French Patent Application 88-09025.

This device comprises a crossed carriage support which can be used to obtain the complete breakage of the fin.

To this end, the end of the fin is gripped between the two parts of the tongs and the front carriage of the support device is displaced in an alternating to-and-fro movement in order to produce successive folding of the fin in either direction along the folding line showing the incipient breakage. This breaks the fin completely and the latter is deposited in a removal container placed in the vicinity of the assembly.

It may be noted that the removal of some fins is unlikely to impair the normal operation of the reactor nor to substantially influence the safety of this reactor.

The operation for overhauling the fins of the assembly can thus consist either in straightening a fin whose inclination is defective, if this fin does not show an incipient breakage, in particular, along its folding line, or in removing this fin if the latter is likely to break during the straightening operation.

The invention is applicable to the overhauling of guide fins of any fuel assembly comprising spacer grids whose peripheral small plates comprise guide fins on their upper edge and/or on their lower edge.

I claim:

1. Device for straightening the guide fins (12) of the spacer grids (2) of a nuclear reactor fuel assembly (1) transversely retaining fuel rods (6), said device comprising an outer frame whose transverse section corresponds to a section of the assembly consisting of small metal plates (10) comprising, on at least one of their sides corresponding to one of the edges of the frame, an assembly of fins (12) having an inclination which is perfectly defined relative to the corresponding small plate (10), the operation for straightening the fins whose inclination has been modified by folding during operation of handling of the fuel assembly being effected remotely and under a predetermined depth of water in a fuel assembly storage pool, the device further comprising (a) a rod (25) on which is mounted a means (26) for support and displacement of a work tool (35) at the level of the assembly and which is movable in an axial direction of the rod (25) and in two direction perpendicular to this axial direction;

(b) guide means (39) fixed rigidly on the tool support (26) and having a slide which has a direction perpendicular to a shaft (44) of the rod (25);

(c) a sliding block (42) mounted for movement along the slide of the guide means (39);

(d) a bearing stop (45) fixed rigidly to one of the ends of the guide means (39) adjacent a corresponding end of the slide;

(f) means for folding at least one fin integrally attached to one end of the sliding block (42) which is distant from the shaft (44) of the rod (25) and located outside the slide of the guide means (39) adjacent the bearing stop (45);

(g) a ball remote control (30) for displacing the sliding block (42) in the guide means (39), said ball remote control (30) being activated manually from a control station (28) located above the level of the fuel assembly storage pool; and (h) at least one video camera carried by the support (26) in order to provide an image of the zone in which straightening is being performed.

2. Device according to claim 1, wherein the means (43) for folding the fin (12) consists of a hook fixed to the end of the sliding block and comprising an end part forming a nose having an inclined inner surface whose inclination relative to a vertical plane corresponds to the perfectly defined inclination of the fin (12) relative to small plate (10).

3. Device according to claim 1, wherein the means (65) for folding the fin (12) consists of a hook fixed to the end of the sliding block (42), whose end part forms a nose (66) having an inner surface (67) whose inclination relative to a vertical plane is substantially greater than the defined inclination of the fin (12) relative to the small plate (10).

4. Device according to claim 1, wherein the folding means (68) consists of a thrust device having an end outer surface (70) having an inclination relative to a vertical plane which is substantially identical to the defined inclination of a fin (12) relative to the corresponding small plate (10).

5. Device according to claim 1, wherein the means for folding the fin (12) consists of at least two hooks or thrust devices fixed in positions adjacent to the end of at least one sliding block (42).

6. Device according to claim 5, wherein the means for folding the fins comprises a number of hooks (43) which is identical to the number of fins disposed along one of the edges of a small plate (10) of a spacer grid (2), straightening of all the fins associated with the edge of the small plate (10) being effected in a single operation.

7. Device according to claim 1, wherein it comprises at least two carriages (26) with crossed displacements in directions perpendicular to the axis of the road (25), each of the crossed carriage devices (26) carrying a work tool (35) of a specific type.

* * * * *